United States Patent
Carper

(10) Patent No.: US 7,310,949 B2
(45) Date of Patent: *Dec. 25, 2007

(54) METHOD AND APPARATUS FOR ARRESTING A CRACK WITHIN A BODY

(75) Inventor: Douglas M. Carper, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 781 days.

This patent is subject to a terminal disclaimer.

(21) Appl. No.: 10/703,274

(22) Filed: Nov. 7, 2003

(65) Prior Publication Data

US 2005/0116061 A1 Jun. 2, 2005

(51) Int. Cl.
*F02C 1/00* (2006.01)

(52) U.S. Cl. ............... 60/772; 29/889.1; 428/63; 156/98

(58) Field of Classification Search ......... 29/889.1, 29/402.09, 402.11, 402.18; 428/63; 156/98, 156/71; 60/772
See application file for complete search history.

(56) References Cited

U.S. PATENT DOCUMENTS

| | | | |
|---|---|---|---|
| 4,780,432 A | 10/1988 | Minford et al. | |
| 4,837,230 A | 6/1989 | Chen et al. | |
| 4,916,092 A | 4/1990 | Tiegs et al. | |
| 4,994,416 A | 2/1991 | Tiegs et al. | |
| 5,137,852 A | 8/1992 | Morgan et al. | |
| 5,514,474 A * | 5/1996 | Morgan et al. | 428/375 |
| 5,584,173 A | 12/1996 | Lybarger | |
| 5,839,663 A | 11/1998 | Broadway et al. | |
| 5,972,141 A * | 10/1999 | Ellyin | 156/94 |
| 6,077,615 A * | 6/2000 | Yada et al. | 428/544 |
| 6,156,142 A * | 12/2000 | Marzari | 156/94 |
| 6,240,720 B1 * | 6/2001 | Tseng et al. | 60/770 |
| 6,338,906 B1 | 1/2002 | Ritland et al. | |
| 6,471,469 B2 | 10/2002 | Toffan et al. | |
| 7,028,462 B2 * | 4/2006 | Carper et al. | 60/230 |
| 7,146,725 B2 * | 12/2006 | Kottilingam et al. | 29/889.1 |
| 2004/0247789 A1 * | 12/2004 | Boucard et al. | 427/253 |
| 2005/0015980 A1 * | 1/2005 | Kottilingam et al. | 29/888.011 |
| 2005/0097892 A1 * | 5/2005 | Carper et al. | 60/771 |
| 2005/0106356 A1 * | 5/2005 | Ikeshima | 428/116 |
| 2006/0234579 A1 * | 10/2006 | Adam et al. | 442/136 |

* cited by examiner

*Primary Examiner*—William H. Rodriguez
(74) *Attorney, Agent, or Firm*—Wesly Alig; William Scott Andes

(57) ABSTRACT

An inseparable assembly includes a body having a first surface and a second surface. The body includes an oxide-based ceramic matrix composite material having a first predetermined ductility. The assembly further includes a crack extending through the body between the first surface and the second surface, and a patch bonded to at least one of the first surface and the second surface overlapping at least a portion of an edge of the crack. The patch includes a second material having a second predetermined ductility that is greater than the first ductility.

19 Claims, 3 Drawing Sheets

METHOD AND APPARATUS FOR ARRESTING A CRACK WITHIN A BODY

BACKGROUND OF THE INVENTION

The present invention relates generally to ceramic matrix composite materials, and more specifically to a method and apparatus for arresting cracks within ceramic matrix composite materials.

Gas turbine engines typically include a compressor, a combustor, and a turbine. Airflow entering the compressor is compressed and channeled to the combustor, wherein the air is mixed with a fuel and ignited within a combustion chamber to produce combustion gases. The combustion gases are channeled to a turbine that extracts energy from the combustion gases for powering the compressor. One turbine extracts energy from the combustion gases to power the compressor. Other turbines may be used to power an output shaft connected to a load, such as an electrical generator. In some applications, the combustion gases exiting the turbine(s) are channeled through an engine exhaust nozzle to produce thrust for propelling an aircraft in flight.

Some known gas turbine aircraft engines include an engine exhaust nozzle having a variable geometry configuration, wherein a cross-sectional area of the exhaust nozzle is adjustable. Variable geometry exhaust nozzles typically have a plurality of flaps and a plurality of seals mounted circumferentially about a centerline of the exhaust nozzle. The seals are mounted generally between adjacent nozzle flaps, such that the flaps and seals form a generally continuous interior surface that directs a flow of the combustion gases through the exhaust nozzle. As their name implies, the seals seal the spaces between the flaps and shield various components of the exhaust nozzle from high temperatures and high thermal gradients during flow of the combustion gases therein.

To facilitate extending a useful life at high temperature operation, some seals are fabricated from non-metallic composite materials, such as ceramic matrix composite materials. However, even such non-metallic materials experience wear and other damage due to the hostile operating environment in gas turbine engines. For example, cracks may develop within the seals because of the high thermal gradients the seals experience during operation. Known methods for repairing such cracks typically include replacement of the seal with an undamaged seal, or replacement of a portion of the seal with undamaged material. However, replacement of a seal or a portion thereof can be costly and may result in disposal of seals still having a useful operational life.

SUMMARY OF THE INVENTION

In one aspect, an inseparable assembly is provided including a body having a first surface and a second surface. The body includes an oxide-based ceramic matrix composite material having a first predetermined ductility. The assembly further includes a crack extending through the body between the first surface and the second surface, and a patch bonded to at least one of the first surface and the second surface overlapping at least a portion of an edge of the crack. The patch includes a second material having a second predetermined ductility that is greater than the first ductility.

In another aspect, a variable geometry exhaust nozzle is provided for a gas turbine engine having an exhaust centerline. The nozzle includes a plurality of flaps arranged around the exhaust centerline, wherein each of the flaps has a sealing surface, and a plurality of flap seals. Each of the seals has a body which includes a sealing surface. The body is positioned between a pair of flaps of the plurality of flaps so that the sealing surface of the seal engages the sealing surface of at least one of the adjacent flaps. At least one of the seals has a crack extending through the seal to the sealing surface of the seal. At least a portion of the crack is overlapped by a patch comprising a metallic wire mesh bonded to the body with an adhesive.

In yet another aspect, a method is provided for arresting a crack within a body having a first surface and a second surface. The body includes an oxide-based ceramic matrix composite material. The crack extends through the body between the first surface and the second surface. The method includes the steps of positioning a patch which includes a metallic wire mesh over at least one of the first surface and the second surface so the patch overlaps at least a portion of an edge of the crack, and bonding the positioned metallic wire mesh to the surface of the body.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
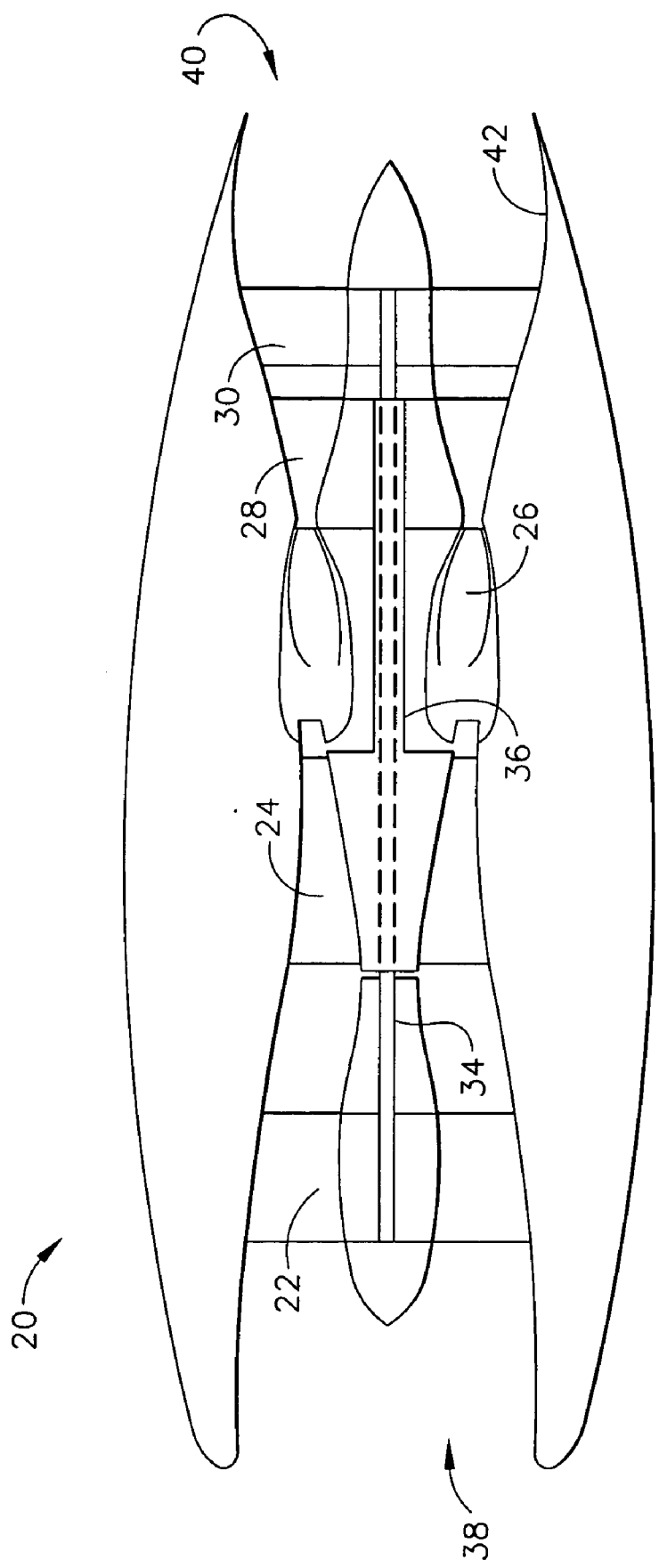
FIG. 1 is a schematic of an exemplary gas turbine engine.

Referring now the to the drawings, FIG. 1 is a schematic of a gas turbine engine 20 including a fan 22, a high pressure compressor 24, and a combustor 26. The engine 20 also includes a high pressure turbine 28 and a low pressure turbine 30. The fan 22 and the turbine 30 are coupled by a first shaft 34, and the high pressure compressor 24 and the turbine 28 are coupled by a second shaft 36. In one embodiment, the engine 20 is a F414 engine commercially available from GE Aircraft Engines, Evendale, Ohio.

In operation, air received through an inlet end 38 of the engine 20 is compressed by the fan 22 and channeled to the high pressure compressor 24, wherein the compressed air is compressed even further. The highly compressed air from the high pressure compressor 22 is channeled to the combustor 26, wherein it is mixed with a fuel and ignited to produce combustion gases. The combustion gases are channeled from the combustor 26 to drive the turbines 28 and 30, and exit an outlet end 40 of the engine 20 through an exhaust nozzle assembly 42 to provide thrust.

Figure 2:
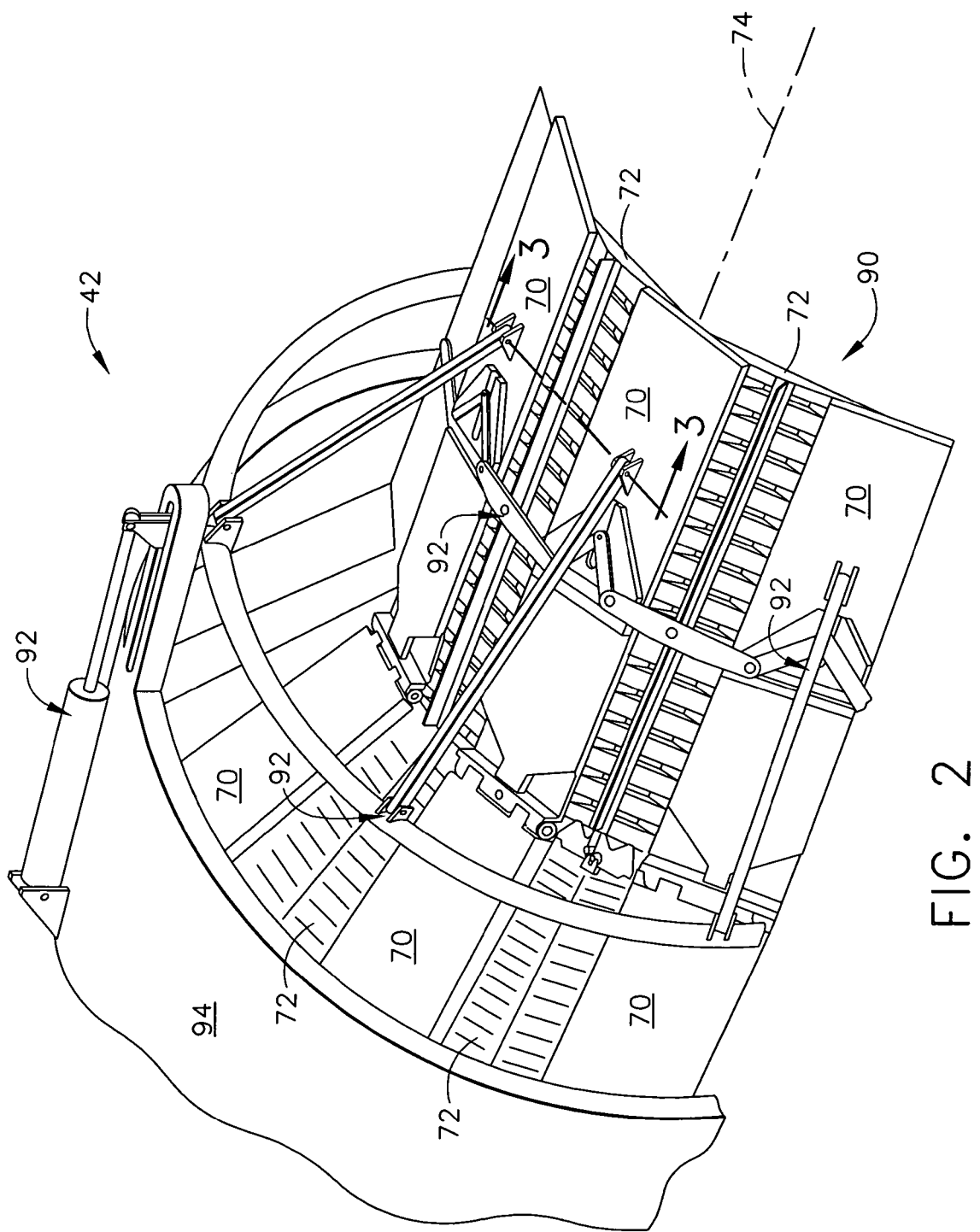
FIG. 2 is a perspective of a portion of the gas turbine engine shown in FIG. 1 illustrating a portion of an exemplary exhaust nozzle assembly.
Figure 3:
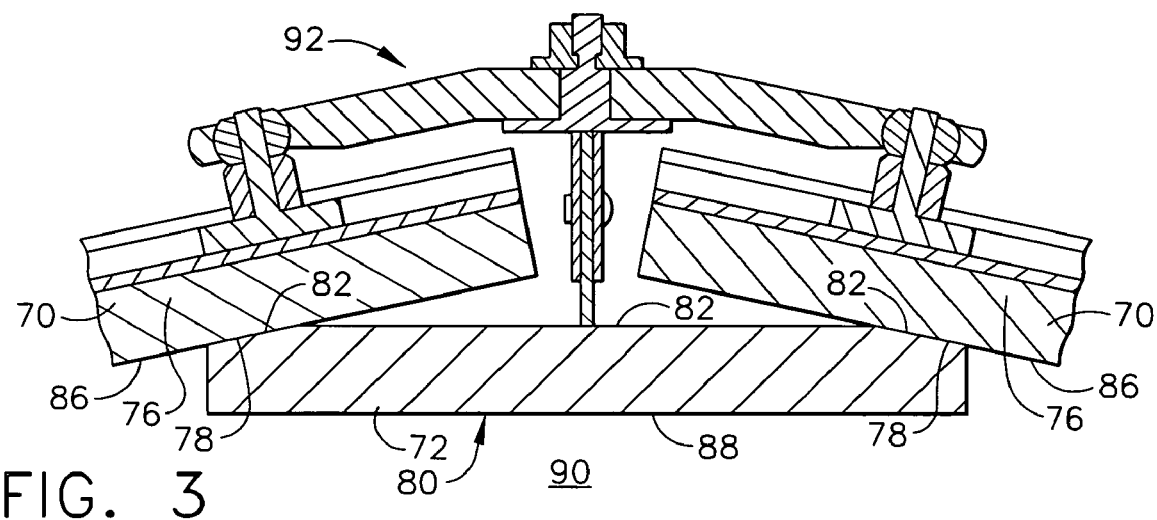
FIG. 3 is a cross section of the exhaust nozzle assembly shown in FIG. 2 taken alone line 3-3 of FIG. 2.

FIG. 2 is a perspective of a portion of the gas turbine engine 20 illustrating a sector of the exhaust nozzle assembly 42. FIG. 3 is a cross section of the exhaust nozzle assembly 42 taken along line 3-3 of FIG. 2. The nozzle assembly 42 includes a plurality of flaps 70 and a plurality of flap seals 72. The flaps 70 and the flap seals 72 are arranged circumferentially around a centerline 74 of the exhaust nozzle assembly 42. Each flap seal 72 is positioned between a pair of adjacent flaps 70 and radially inwardly with respect to the flaps 70, such that a portion of each flap seal 72 overlaps a portion of each adjacent flap 70. More specifically, each flap 70 includes a body 76 having a sealing surface 78, and each flap seal 72 includes a body, generally referred to by the reference numeral 80, having a sealing surface 82. The flap seals 72 overlap adjacent flaps 70 such that during operation of the engine 20 a portion of each flap sealing surface 78 contacts a portion of each corresponding sealing surface 82 generally along an axial length of the flaps 70 and the flap seals 72. In one embodiment, the flap seal bodies 80 are fabricated from a ceramic matrix composite material. In another embodiment, the flap seal bodies 80 are fabricated from an oxide-based ceramic matrix composite material. Additionally, in one embodiment, the flap bodies 76 are fabricated from a ceramic matrix composite material.

Respective radially inner surfaces 86 and 88 of the flaps 70 and the flap seals 72 form a generally continuous interior surface defining an exhaust nozzle orifice 90. The orifice 90 directs a flowpath of gases received from the turbine 30 (shown in FIG. 1) out of the engine outlet end 40 to produce thrust. In the exemplary embodiment, the exhaust nozzle assembly 42 is a variable geometry exhaust nozzle, wherein a cross-sectional area of the nozzle orifice 90 is adjustable. A mounting assembly, generally referred to herein with the reference numeral 92, couples each flap seal 72 to adjacent flaps 70. The assembly 92 is movably coupled to an outer casing 94 of the engine 20 to facilitate adjustment of the cross-sectional area of the orifice 90. Additionally, the assembly 92 allows relative motion between the flaps 70 and the flap seals 72 to facilitate contact between the sealing surfaces 78 and respective sealing surfaces 82, and to facilitate adjustment of the cross-sectional area of the orifice 90. In the exemplary embodiment, the exhaust nozzle orifice 90 is generally annular, however, it should be understood the orifice 90 may be any suitable shape. For example, in an alternative embodiment, the exhaust nozzle orifice 90 is generally rectangular.

During operation of the engine 20, a pressure of the flowpath gases exiting through the exhaust nozzle orifice 90 urges the flap seals 72 against the flaps 70, and more specifically, urges the sealing surfaces 82 of the seals 72 in contact with respective sealing surfaces 78 of the flaps 70. As gases flow through the nozzle assembly 42, and more specifically the exhaust nozzle orifice 90, contact between the sealing surfaces 78 and respective sealing surfaces 82 substantially prevents leakage of gases between the flaps 70 and the flap seals 72.

Figure 4:
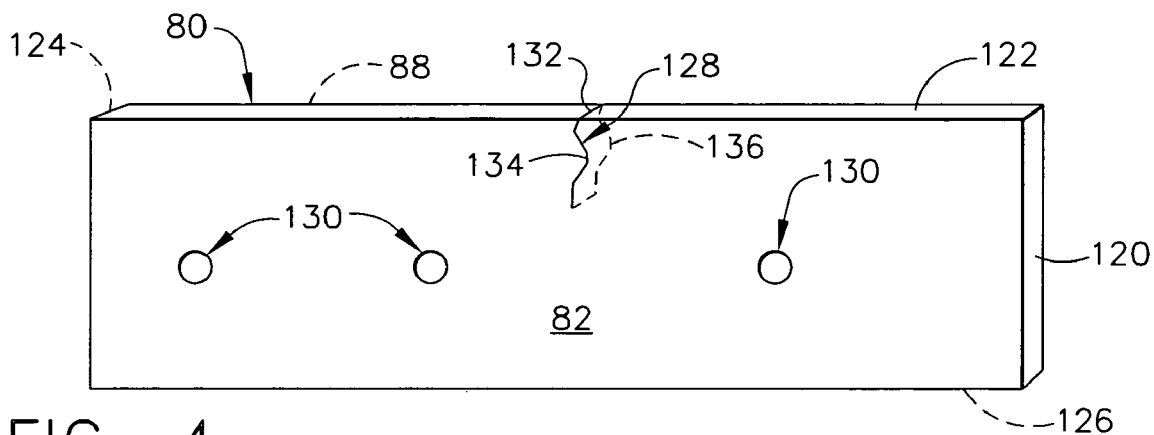
FIG. 4 is a perspective of an exemplary flap seal body for use with the exhaust nozzle assembly shown in FIG. 2.

FIG. 4 is a perspective of an exemplary flap seal body 80 for use with the exhaust nozzle assembly 42 (shown in FIG. 2). The body 80 includes the sealing surface 82 and the radially inner surface 88. In addition to the surfaces 82 and 88, the body 80 includes other surfaces 120, 122, 124, and 126. Any of the surfaces 82, 88, 120, 122, 124, and 126 may be designated a first surface or a second surface. The body 80 also includes a crack, generally referred to by the reference numeral 128, extending therethrough from one surface (e.g., surface 82) to another surface (e.g., surface 88), and a plurality of openings, generally referred to by the reference numeral 130, for attachment to the mounting assembly 92 (shown in FIG. 3). In the exemplary embodiment, the crack 128 extends between edges 132, 134, and 136 corresponding to surfaces 122, 82, and 88 of the body 80. Also, in the exemplary embodiment, the crack 128 extends completely through the body 80 from the sealing surface 82 to the radially inner surface 88. However, it should be understood that the crack 128 may extend anywhere within the body 80 such that the crack 128 extends between (and not necessarily to) any surfaces of the body 80.

The crack 128 may adversely affect the performance and useful life of the flap seal 72. More specifically, the crack 128 may increase a permeability of the body 80, which may result in leakage of gases through the body 80 thereby decreasing an efficiency of the engine 20. Additionally, the crack 128 may facilitate failure of the flap seal 72.

Figure 5:
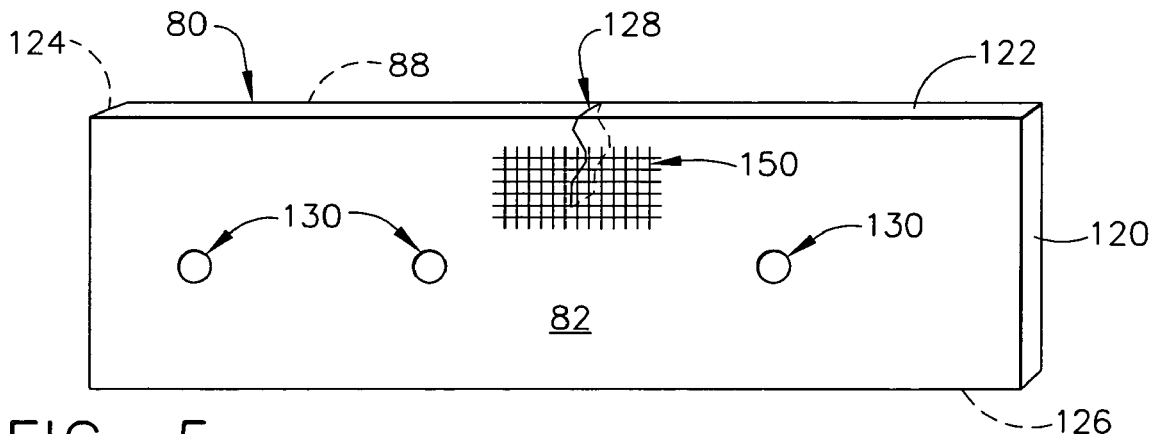
FIG. 5 is a perspective of the flap seal body shown in FIG. 4 having an exemplary patch.

FIG. 5 is a perspective view of the flap seal body 80 including an exemplary patch, generally referred to by the reference numeral 150, bonded thereto to prevent, also referred to herein as arrest, the crack 128 from propagating further through the body 80. In the exemplary embodiment, the patch 150 is bonded to the sealing surface 82. However, it should be understood that the patch 150 may be bonded to any one of, or any plurality of, the surfaces 82, 88, 120, 122, 124, and 126. Additionally, in one embodiment, the seal body 80 includes a plurality of the patches 150 bonded thereto. The patch 150 has a predetermined ductility that is greater than a predetermined ductility of a portion of the flap seal body 80 adjacent the crack 128. In one embodiment, the flap seal body 80 has a substantially uniform ductility throughout that is less than the predetermined ductility of the patch 150.

In the exemplary embodiment, the patch 150 is bonded to the body 80 such that the patch 150 overlaps a portion of the crack edge 134. However, it should be understood that the patch 150 may be bonded to the body 80 in any suitable position that facilitates arresting the crack 128, and more specifically, such that the patch 150 overlaps at least a portion of any edge of the crack 128. The patch 150 is bonded to the seal body 80 using an adhesive. In one embodiment, the adhesive used to bond the patch 150 to the seal body 80 is a ceramic adhesive, for example, a ceramic adhesive produced by combining a glass powder, for example, SP921® glass powder from Specialty Glass, Fla., and an alumina powder with a silica yielding polymer. Another example of a ceramic adhesive is Cotronics 901® adhesive, available from Cotronics Corporation, Brooklyn, N.Y. Additionally, in the exemplary embodiment, the patch 150 is a metallic wire mesh, however, it should be understood that the patch 150 may be any material, and may be fabricated in any material configuration, having a ductility greater than a predetermined ductility of a portion of the flap seal body 80 that is adjacent the crack 128. In one embodiment, the patch 150 is a metallic wire mesh fabricated from a nickel-based alloy, such as, for example, HAYNES® HASTELLOY X™ alloy, commercially available from Haynes International, Inc., Kokomo, Ind. In another embodiment, the patch 150 is a metallic wire mesh fabricated from a cobalt-based alloy, such as, for example, HAYNES® alloy 230, commercially available from Haynes International, Inc., Kokomo, Ind. In yet another embodiment, the patch 150 is a metallic wire mesh fabricated from stainless steel, such as, for example, stainless steel grade 316 commercially available from Cleveland Wire Cloth, Cleveland, Ohio.

Prior to bonding the patch 150 to the flap seal body 80, the sealing surface 82 is cleaned by slightly sanding the surface and applying a solvent, for example acetone or isopropanol, to provide a substantially wetable surface that facilitates adhesion between the adhesive and the sealing surface 82. After cleaning, the adhesive is applied to the patch 150 and the sealing surface 82. The patch 150 is then positioned on the sealing surface 82 over the crack 128 such that the patch 150 overlaps a portion of the crack edge 134, as illustrated in FIG. 5. Once dry, the adhesive bonds the patch 150 to the sealing surface 82. The greater ductility of the patch 150 with respect to the body 80 prevents the crack 128 from propagating through the body 80 by reinforcing the body 80 adjacent a portion of the crack edge 134.

The above-described patch is cost-effective and reliable for arresting the propagation of a crack through a ceramic matrix composite material. More specifically, the patch facilitates reinforcing a portion of the ceramic matrix composite material that is adjacent the crack. As a result, the patch may increase the performance and useful life of the ceramic matrix composite material, and thereby reduce replacement costs. Additionally, the patch may increase a wear resistance and a strain to failure ratio of the ceramic matrix composite material, and may allow the ceramic matrix composite material to experience higher thermal gradients without failing. In the exemplary embodiment, the patch facilitates increasing the performance and useful life of a gas turbine engine exhaust seal having a crack therein. As a result, the exemplary patch facilitates maintaining a desired operational efficiency of the gas turbine engine without replacing cracked exhaust seals within the engine.

Although the invention is herein described and illustrated in association with a gas turbine engine, and more specifically, in association with an exhaust nozzle seal for use with a gas turbine engine, it should be understood that the present invention is applicable to any ceramic matrix composite material. Accordingly, practice of the present invention is not limited to gas turbine engine exhaust nozzle seals nor gas turbine engines generally. Additionally, practice of the present invention is not limited to gas turbine engine exhaust nozzle seals that are fabricated from ceramic matrix composite materials. Rather, it should be understood that the present invention is applicable to gas turbine engine seals that are fabricated from materials other than ceramic matrix composite materials.

Exemplary embodiments of gas turbine engine exhaust nozzle assemblies are described above in detail. The assemblies are not limited to the specific embodiments described herein, but rather, components of each assembly may be utilized independently and separately from other components described herein. Each exhaust nozzle assembly component can also be used in combination with other exhaust nozzle assembly components.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. An inseparable assembly comprising:
   a body having a first surface and a second surface, said body comprising an oxide-based ceramic matrix composite material having a first predetermined ductility;
   a crack extending through said body between said first surface and said second surface; and
   a patch bonded to at least one of said first surface and said second surface overlapping at least a portion of an edge of said crack, said patch comprising a second material having a second predetermined ductility greater than said first ductility.

2. An assembly in accordance with claim 1 wherein the patch comprises a metallic wire mesh.

3. An assembly in accordance with claim 2 wherein the metallic wire mesh comprises a nickel-based alloy.

4. An assembly in accordance with claim 2 wherein the metallic wire mesh comprises a cobalt-based alloy.

5. An assembly in accordance with claim 2 wherein the metallic wire mesh comprises a stainless steel.

6. An assembly in accordance with claim 1 wherein the patch is bonded to the body with an adhesive.

7. An assembly in accordance with claim 6 wherein said adhesive comprises a ceramic adhesive.

8. An assembly in accordance with claim 7 wherein said ceramic adhesive comprises the combination of a glass powder, an alumina powder, and a silica yielding polymer.

9. An assembly in accordance with claim 1 wherein said body comprises a seal for a gas turbine engine.

10. An assembly in accordance with claim 9 wherein the seal comprises an exhaust nozzle seal.

11. A variable geometry exhaust nozzle for a gas turbine engine having an exhaust centerline, said nozzle comprising:
    a plurality of flaps arranged around the exhaust centerline, each of said flaps having a sealing surface; and
    a plurality of flap seals, each of said seals having a body including a sealing surface and being positioned between a pair of flaps of said plurality of flaps so that the sealing surface of the seal engages the sealing surface of at least one of said adjacent flaps,
    wherein at least one of said seals has a crack extending through the seal to the sealing surface of the seal, and at least a portion of the crack is overlapped by a patch comprising a metallic wire mesh bonded to the body with an adhesive.

12. A variable geometry exhaust nozzle in accordance with claim 11 wherein said seal body comprises an oxide-based ceramic matrix composite material.

13. A variable geometry exhaust nozzle in accordance with claim 12 wherein said adhesive comprises a ceramic adhesive.

14. A variable geometry exhaust nozzle in accordance with claim 13 wherein said ceramic adhesive comprises the combination of a glass powder, an alumina powder, and a silica yielding polymer.

15. A variable geometry exhaust nozzle in accordance with claim 11 wherein said metallic wire mesh comprises at least one of a nickel-based alloy, a cobalt-based alloy, and a stainless steel.

16. A method for arresting a crack within a body having a first surface and a second surface, said body comprising an oxide-based ceramic matrix composite material, said crack extending through the body between said first surface and said second surface, said method comprising the steps of:
    positioning a patch comprising a metallic wire mesh over at least one of said first surface and said second surface so the patch overlaps at least a portion of an edge of the crack; and
    bonding the positioned metallic wire mesh to said surface of the body.

17. A method in accordance with claim 16 wherein the edge of the crack extends to said first surface and the patch is positioned to overlap the edge of the crack on the first surface.

18. A method in accordance with claim 16 wherein said mesh is bonded to the body using a ceramic adhesive.

19. A method in accordance with claim 16 further comprising the step of cleaning at least one of said first surface and second surface prior to bonding the mesh to the body to provide a substantially wetable surface.

* * * * *